US012386943B2

(12) United States Patent
Sankovsky (10) Patent No.: US 12,386,943 B2
(45) Date of Patent: *Aug. 12, 2025

(54) SYSTEMS AND METHODS FOR DETECTING DIGITAL SECURITY BREACHES OF CONNECTED ASSETS BASED ON LOCATION TRACKING AND ASSET PROFILING

(71) Applicant: Allstate Insurance Company, Northbrook, IL (US)

(72) Inventor: Jenny Sankovsky, Hawthorn Woods, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,364

(22) Filed: Jun. 28, 2022

(65) Prior Publication Data
US 2023/0153912 A1 May 18, 2023

Related U.S. Application Data

(63) Continuation of application No. 15/061,593, filed on Mar. 4, 2016, now Pat. No. 11,373,245.

(51) Int. Cl.
*G06F 21/44* (2013.01)
*G06Q 20/40* (2012.01)
(Continued)

(52) U.S. Cl.
CPC ......... *G06F 21/44* (2013.01); *G06Q 20/4016* (2013.01); *G06Q 40/08* (2013.01); *H04L 63/101* (2013.01); *H04L 63/107* (2013.01)

(58) Field of Classification Search
CPC .. G06Q 40/08; G06Q 20/4016; H04L 63/101; H04L 63/107; H04W 12/61; G06F 21/44
See application file for complete search history.

(56) References Cited

U.S. PATENT DOCUMENTS 6,243,039 B1 6/2001 Elliot
7,106,189 B2 9/2006 Burneske et al.
(Continued)

FOREIGN PATENT DOCUMENTS

KR 20030079356 A 10/2003
WO WO-2008140683 A2 11/2008

OTHER PUBLICATIONS

"A Guide to Cyber Risk," Allianz Global Corporate & Specialty, Copyright 2015, Sep. 2015, 32 pages.
(Continued)

*Primary Examiner* — Steven S Kim (57) ABSTRACT

Systems and methods are provided for detecting unauthorized manipulations of assets. A digital security breach detection system requests and receives an insurance policy from an insurance system for an asset. The digital security breach detection system further analyzes transactions received by the asset from various devices to determine whether the transactions are unauthorized manipulations. In response to detecting an unauthorized manipulation, the digital security breach detection system generates notifications to pre-authorized devices associated with the asset. Additionally, the digital security breach detection system generates claims relating to the unauthorized manipulation under the insurance policy for the asset.

20 Claims, 5 Drawing Sheets

(51) Int. Cl.
*G06Q 40/08* (2012.01)
*H04L 9/40* (2022.01)

(56) References Cited

U.S. PATENT DOCUMENTS

| | | | |
|---|---|---|---|
| 7,386,463 B2 | 6/2008 | McCabe | |
| 7,974,861 B1 | 7/2011 | Bohanek | |
| 8,624,727 B2 | 1/2014 | Saigh et al. | |
| 9,032,531 B1 | 5/2015 | Scorvo et al. | |
| 9,098,584 B1 | 8/2015 | Fredinburg et al. | |
| 9,248,794 B2* | 2/2016 | Chang | B60R 16/0373 |
| 9,274,786 B2* | 3/2016 | Ji | G01C 21/3896 |
| 9,521,160 B2 | 12/2016 | Ng et al. | |
| 9,525,700 B1* | 12/2016 | Malinowski | G06N 7/01 |
| 9,786,154 B1* | 10/2017 | Potter | G08B 21/02 |
| 9,892,463 B1* | 2/2018 | Hakimi-Boushehri | G06Q 10/10 |
| 10,152,876 B2 | 12/2018 | Joao | |
| 10,154,048 B2* | 12/2018 | Krishnamurthi | H04W 4/023 |
| 10,157,423 B1 | 12/2018 | Fields et al. | |
| 10,168,703 B1* | 1/2019 | Konrardy | G06F 30/15 |
| 10,282,787 B1 | 5/2019 | Hakimi-Boushehri et al. | |
| 11,100,465 B1 | 8/2021 | Burge | |
| 11,195,184 B1* | 12/2021 | Dixon | G06Q 40/08 |
| 2002/0178374 A1* | 11/2002 | Swimmer | G06F 21/568 726/24 |
| 2003/0028803 A1 | 2/2003 | Bunker, V et al. | |
| 2003/0088348 A1* | 5/2003 | Gustavsson | G08G 1/052 701/29.1 |
| 2004/0123106 A1 | 6/2004 | D'Angelo et al. | |
| 2005/0120106 A1* | 6/2005 | Albertao | H04L 67/34 709/223 |
| 2005/0253726 A1* | 11/2005 | Yoshida | B60R 25/04 340/572.8 |
| 2007/0022480 A1 | 1/2007 | Newman | |
| 2007/0220266 A1 | 9/2007 | Cooper et al. | |
| 2008/0126377 A1 | 5/2008 | Bush et al. | |
| 2010/0100970 A1* | 4/2010 | Roy-Chowdhury | H04L 67/55 726/1 |
| 2010/0289644 A1 | 11/2010 | Slavin et al. | |
| 2011/0191265 A1* | 8/2011 | Lowenthal | B60L 53/65 705/412 |
| 2013/0033375 A1 | 2/2013 | Doyle et al. | |
| 2013/0283377 A1* | 10/2013 | Das | G06F 21/51 726/23 |
| 2014/0007067 A1* | 1/2014 | Nelson | G06F 8/654 717/168 |
| 2014/0142988 A1 | 5/2014 | Grosso et al. | |
| 2014/0337925 A1 | 11/2014 | Marshall et al. | |
| 2015/0046405 A1* | 2/2015 | Brueckner | H04L 63/145 707/684 |
| 2015/0066577 A1 | 3/2015 | Christiansen et al. | |
| 2015/0074003 A1 | 3/2015 | Tickner et al. | |
| 2015/0169311 A1* | 6/2015 | Dickerson | G06F 8/65 717/170 |
| 2015/0180708 A1 | 6/2015 | Jacob et al. | |
| 2015/0363210 A1* | 12/2015 | Wehrman | G06F 8/65 701/31.5 |
| 2016/0034359 A1 | 2/2016 | Cabrera et al. | |
| 2016/0094578 A1 | 3/2016 | McQuillan et al. | |
| 2016/0112445 A1 | 4/2016 | Abramowitz | |
| 2016/0224660 A1 | 8/2016 | Munk et al. | |
| 2017/0060559 A1* | 3/2017 | Ye | G06F 8/65 |
| 2017/0085595 A1 | 3/2017 | Ng et al. | |
| 2017/0093866 A1 | 3/2017 | Ben-Noon et al. | |
| 2018/0004949 A1 | 1/2018 | Lutz et al. | |
| 2018/0373866 A1 | 12/2018 | Sweeney et al. | |
| 2019/0050217 A1 | 2/2019 | Tatourian | |
| 2023/0153912 A1* | 5/2023 | Sankovsky | H04L 63/101 705/65 |

OTHER PUBLICATIONS

Handel P., et al., "Smartphone Instrumentation for Insurance Telematics," IEEE International Instrumentation and Measurement Technology Conference (I2MTC) Proceedings, 2015, 4 pages.

* cited by examiner

| Asset Protection Services 410 |
|---|

Please tell us if you, or someone you authorized, recently attempted the following transaction:

| ATTEMPTED TRANSACTION | ASSET ID | STATUS | DATE |
|---|---|---|---|
| INCREASE VEHICLE SPEED TO 120 MPH | <<ASSET IDENTIFIER>> | HOLD | <<DATE>> |

412

Do you approve this transaction?

| YES, APPROVE 414 | NO, REJECT 416 |
|---|---|

SYSTEMS AND METHODS FOR DETECTING DIGITAL SECURITY BREACHES OF CONNECTED ASSETS BASED ON LOCATION TRACKING AND ASSET PROFILING

CROSS-REFERENCE TO RELATED APPLICATION

The present application claims priority to U.S. patent application Ser. No. 15/061,593, filed on Mar. 4, 2016, which is incorporated by reference in its entirety herein.

BACKGROUND

Insurance providers value the safety of its customers, their assets, and the general public. Due to increased connectivity, many everyday assets are now configured for remote accessibility and are therefore exposed to risk of digital security breaches by unauthorized users and devices. Unauthorized manipulations may lead not only to the damage of the asset subjected to the digital security breach, but also other related or nearby assets. In conventional arrangements, it may be difficult or impossible to timely detect digital security breaches of an asset and thereby minimize the damage.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Some aspects described herein provide a digital security breach detection system. The digital security breach detection system may include at least one processor. The digital security breach detection system may be configured to, in operation, receive a notification, from an asset, of a transaction from a requesting device requesting modification of the asset. Responsive to the notification, the digital security breach detection system may be configured to, in operation, determine whether the requesting device is a pre-authorized device, and whether a location of the requesting device is within a threshold radius of the location of the asset. Responsive to determining that the requesting device is not a pre-authorized device and/or is not within a threshold radius of the asset, the digital security breach detection system may be configured to, in operation, generate an asset profile for the asset based on sensor data. The digital security breach detection system may be configured to, in operation, use the asset profile to determine whether the modification requested by the transaction is consistent with the asset profile. Responsive to determining that it is not, the digital security breach detection system may notify the asset of an unauthorized manipulation and provide instructions to cancel the transaction. Further, the digital security breach detection system may be configured to, in operation, generate an insurance claim based on the unauthorized manipulation under an insurance policy for the asset.

Additional aspects described herein are directed to an asset that may include one or more sensors, and at least one processor. The asset may be configured to, in operation, receive a transaction requesting a modification of the asset from a requesting device. The asset may issue a temporary hold on the transaction. Further, the asset may collect sensor data from the one or more sensors, and notify a digital security breach detection system of the transaction and of the sensor data. In response, the asset may be configured to, in operation, receive a notification of an unauthorized manipulation and instructions to cancel the transaction from the digital security breach detection system. Further, responsive to the instructions, the asset may be configured to, in operation, remove the temporary hold on the transaction and cancel the transaction.

Still other aspects described herein provide a computer-assisted method of detecting digital security breaches. A special-purpose computing system may receive a notification, from an asset, of a transaction from a requesting device requesting modification of the asset. Responsive to the notification, the special-purpose computing system may determine whether the requesting device is a pre-authorized device, and whether a location of the requesting device is within a threshold radius of the location of the asset. Responsive to determining that the requesting device is not a pre-authorized device and is not within the threshold radius of the asset, the special-purpose computing device may generate an asset profile for the asset based on sensor data. The special-purpose computing system may then use the asset profile to determine whether the modification requested by the transaction is consistent with the asset profile. Responsive to determining that it is not, the special-purpose computing system may notify the asset of an unauthorized manipulation and provide instructions to cancel the transaction. Further, the special-purpose computing system may generate an insurance claim based on the unauthorized manipulation under an insurance policy for the asset.

The details of these and other aspects of the disclosure are set forth in the accompanying drawings and description below. Other features and advantages of aspects of the disclosure will be apparent from the description and drawings.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements. It will be appreciated with the benefit of this disclosure that the steps illustrated in the accompanying figures may be performed in other than the recited order and that one or more of the steps may be optional. It will also be appreciated with the benefit of this disclosure that one or more components illustrated in the accompanying figures may be positioned in other than the disclosed arrangement and that one or more of the components illustrated may be optional.

DETAILED DESCRIPTION

In the following description of the various embodiments, references are made to the accompanying figures, which form a part hereof, and in which are shown by way of illustration, various embodiments of the disclosure that may be practiced. Other embodiments may be utilized.

As a general introduction to the subject matter described in more detail below, aspects of the present disclosure are directed toward an asset protection system, including a digital security breach detection system and one or more assets. The assets may be connected home devices/appliances (e.g., refrigerators, ovens, stoves, water heaters, washing machines, dryers, dishwasher, furnaces, air conditioning units, smoke detectors, alarms, coffee makers, etc.), connected vehicles, autonomous vehicles, and the like. It will be appreciated that assets may be other devices or systems without departing from the invention.

The digital security breach detection system monitors transactions at an asset in order to detect unauthorized manipulations of the assets. The digital security breach detection system may be configured with various rules to classify a transaction as an unauthorized manipulation. For example, the digital security detection system may analyze whether the requesting device associated with the transaction has been pre-authorized by the asset. Alternatively, the digital security detection system may analyze the location of the requesting device to determine whether it is within a threshold radius of the asset's location. The digital security detection system may also analyze the transaction based on the asset's profile. As such, the digital security detection system may collect operational data from the asset in order to create an asset profile. An asset profile may be generated by analyzing historical trends in the operational data of an asset. An asset profile for a thermostat may, for example, provide an average temperature, a temperature range, seasonal variations, etc. In some cases, the asset profile may vary based on the outside weather conditions (e.g., outside temperature), day of the week (e.g., weekday vs. weekend, etc.), time of day (e.g., morning, evening, night, etc.), and so forth. For instance, an asset profile for thermostat may provide temperature setting or temperature range at which the thermostat is typically set during the workday. In another example, an asset profile for a coffee maker may provide the hours of the day at which the coffee making is typically on. In a further example, an asset profile for a garage door may provide the hours of the day during which door is typically open or closed. In an additional example, an asset profile or a vehicle may provide the average speed of the vehicle for certain hours of the day (e.g., during rush hour traffic, etc.) or certain weather conditions (e.g., in clear conditions, in rainy or snowy conditions, etc.).

Based on the asset profile, the digital security breach detection system may determine whether the intended result of the transaction would be consistent with the asset profile.

In cases where the digital security breach detection system determines, responsive to the hierarchical analysis described above, that there has been an unauthorized manipulation (or an attempted unauthorized manipulation) of the asset, the digital security breach detection system may take steps to minimize the damage caused by the unauthorized manipulation. For instance, the digital security breach detection system may cancel the transaction in cases where the transaction has not yet been executed by the asset, or it may rollback the transaction in cases where the transaction has already been executed. Further, the digital security breach detection system may notify any pre-authorized devices associated with the asset. In some embodiments, the digital security breach detection system may allow a user of a pre-authorized device to override the determination of the digital security breach detection system. As such, a user of a pre-authorized device may choose to allow a transaction to be executed, even where the digital security breach detection system classified the transaction as an unauthorized manipulation. In these cases, the digital security breach detection system may only issue a temporary cancellation or rollback (e.g., by placing a hold) on the transaction, while awaiting override instructions from a pre-authorized device. Where no override instructions are received within a threshold time period, the digital security breach detection system may issue a final cancellation or rollback on the transaction. By contrast, where override instructions are received within a threshold time period, the digital security breach detection system may notify the asset to allow the transaction.

In some examples, the digital security breach detection system may request and receive an insurance policy for the breached asset from an insurance system. The digital security breach detection system may generate claims under the insurance policy for the asset, subject to the terms of the insurance policy.

In some examples, the digital security breach detection system may be implemented by an entity, such an insurance provider.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof, as well as additional items and equivalents thereof. As used in this description, a set refers to a collection of one or more elements. As used in this description, a driver, as used in the description, refers to any individual operating a vehicle. The individual may or may not hold a fully qualified driver's license. The individual may or may not hold an insurance policy.

Figure 1:
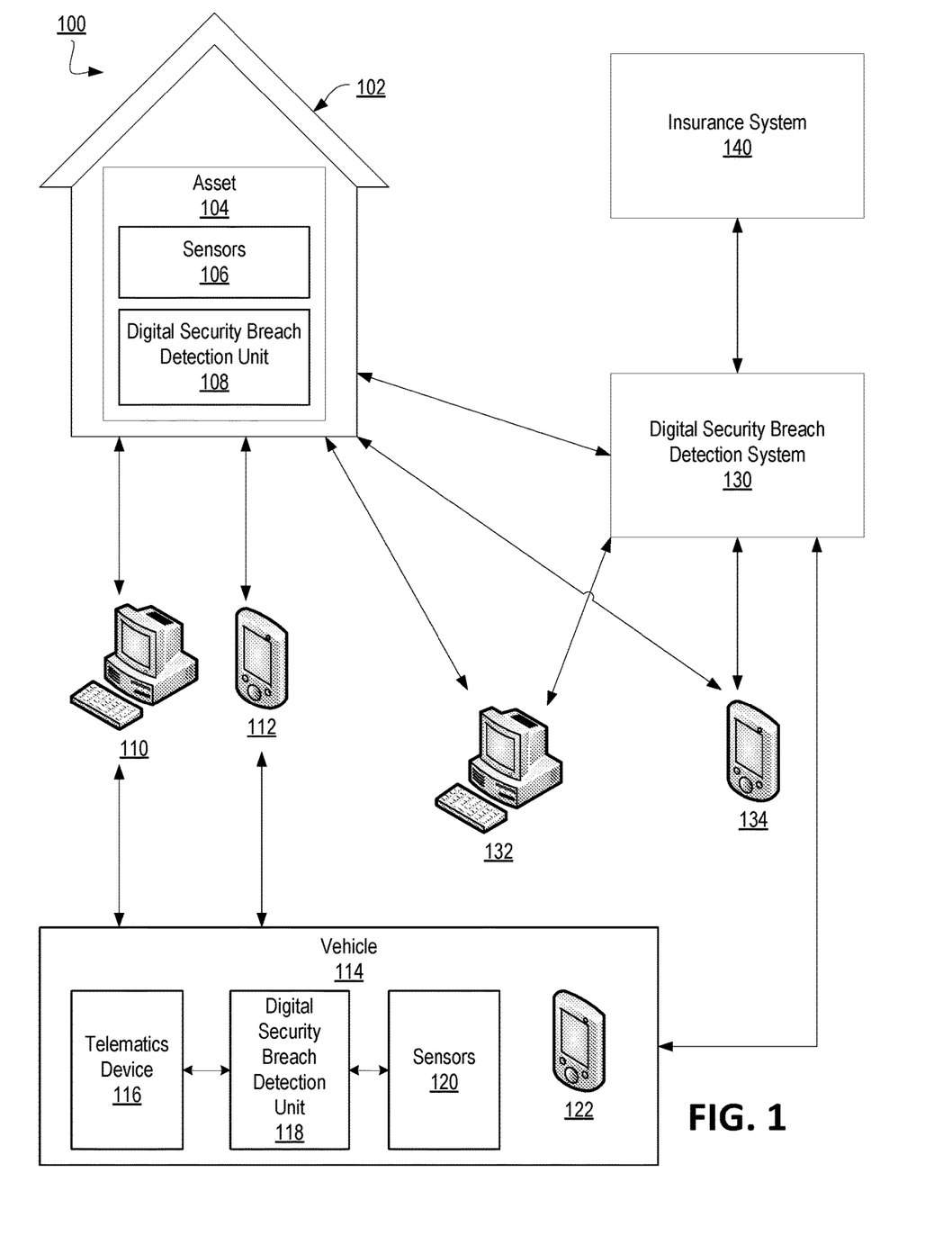
FIG. 1 is a block diagram illustrating various components and devices associated with an example digital security breach detection system, according to one or more aspects of the disclosure.

FIG. 1 is an illustration of an example implementation of an asset protection system 100. The system 100, in this example, includes a digital security breach detection system 130. The digital security breach detection system 130, described in further detail below, detects manipulations of an asset by analyzing transactions received by the asset to determine whether the manipulations, or requested manipulations, are unauthorized. In one example, the asset 104 may be installed at, attached to, or in signal communication with a home 102. Further, the home 102 may be in signal communication with the digital security breach detection system. In another example, the asset may be a vehicle 114. The assets (asset 104 or vehicle 114) are network-enabled, and thus capable of communicating via wired or wireless networks, such that the digital security breach detection system 130 may be in signal communication with the assets. As such, the assets may include any device configured such that it may be considered as part of the Internet of Things.

Transactions at the asset (asset 104 or vehicle 114) may be received from a computing system 110 (e.g., laptop, desktop, web server, database server, on-board vehicle computer, short-range communication system, etc.) or from a mobile computing system 112 (e.g., mobile phone, smartphone, tablet, wearable device, etc.). The digital security breach detection system 130 may analyze the transactions in view of a combination of the following: (1) the identity of the requesting device (e.g., to determine whether the requesting device is pre-authorized or otherwise recognized by the asset); (2) the location of the requesting device (e.g., to determine whether the requesting device is/was within a threshold radius of the asset at the time of the transaction); and (3) data received from sensors associated with the asset, where the sensors may be installed at, attached to, or in signal communication with the asset or various systems or components of the asset (e.g., to determine whether the intended result of the transaction is consistent with the typical operation of the asset). The digital security breach detection system 130 may determine the identity of a requesting device based on a unique device identifier (e.g., a device ID, a serial number, a Unique Device Identification (UDI/UDID/UUID), etc.) or Internet Protocol (IP) address. In other examples, the digital security breach detection system 130 may construct a unique identifier for the requesting device based on a unique combination of one or more device attributes, such as a unique device identifier, device type, IP address, and so forth.

In examples where the asset is a vehicle, transactions may also be analyzed in view of telematics data. Vehicle telematics data, as used in this description, refers to data indicating how a driver operates a vehicle with respect to, e.g., accelerating, decelerating, braking, turning, signaling, lane usage, adequate vehicle spacing, speed, distraction management, and other driving-related operations performed by the driver at the vehicle. Vehicle telematics data may also include operational data of the vehicle (e.g., performance data, maintenance data, and the like). A vehicle telematics device may be installed at, attached to, or in signal communication with a vehicle or various systems or components of the vehicle.

In response to detecting an unauthorized manipulation, the digital security breach detection system 130 may be in signal communication with the breached asset (asset 104 or vehicle 114) in order to cancel or rollback the transaction. Further, the digital security breach detection system 130 may be in signal communication with one or more computing systems 132 or mobile computing systems 134 to provide notifications, where the one or more computing systems 132 or mobile computing systems 134 are pre-authorized devices associated with the breached asset (asset 104 or vehicle 114). The digital security breach detection system 130 may also be in signal communication with one or more insurance systems 140 to request and receive information regarding an insurance policy associated with an asset, and/or to generate claims under an insurance policy covering the breached asset.

The digital security breach detection system 130 is a special-purpose computing device that is configured to receive operational data from one or more assets 104, 114 and/or vehicle driving data from one or more vehicles 114. With reference to assets 104 associated with a home 102, the information may be received from sensors 106 installed in and/or attached to the asset 104. The sensors 106 may be capable of detecting and recording various conditions at the asset and operating parameters of the asset. For instance, the sensors 106 may include a motion sensor, a presence sensor, a light sense, a pressure sensor, a fluid sensor, a sound sensor, a temperature sensor, a chemical sensor, an electric sensor, a magnetic sensor, a vibration sensor, and so forth.

With reference to vehicles 114, the information may be received from (i) telematics devices 116 installed at and attached to the vehicle 114, (ii) from telematics devices 116 located in the vehicle 114 during its operation (e.g., a mobile special-purpose computing device), or (iii) from special-purpose computing devices located remotely relative to the vehicle 114 that received the vehicle telematics data "from the vehicle" as described in (i) or (ii). The digital security breach detection system 130 may also be configured to receive telematics data from one or more third-party telematics systems. Additionally, the digital security breach detection system 130 may receive additional data relevant to vehicle operation data from other non-vehicle data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet and hail amounts, temperatures, wind, road conditions, visibility, etc.) at various times and locations, and other external data sources containing driving hazard data (e.g., road hazards, traffic accidents, downed trees, power outages, construction zones, school zones, and natural disasters, etc.).

In some examples, the digital security breach detection system 130 may acquire information about a vehicle directly from the vehicle 114, where the vehicle telematics data may be generated at the vehicle 114 itself. In such examples, the vehicle 114 may include one or more sensors 120, which are capable of detecting and recording various conditions at the vehicle and operating parameters of the vehicle. For example, the sensors 120 may detect, transmit, or store data corresponding to the vehicle's location (e.g., GPS coordinates), speed and direction, rates of acceleration, deceleration, or braking, and specific instances of sudden acceleration, braking, and swerving. The sensors 120 may also detect, transmit, or store data received from the vehicle's internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 120 may detect and store the external driving conditions, for example, external temperature, rain, snow, light levels, and sun position for driver visibility. Additional sensors 120 may also detect and store data relating to compliance with traffic laws and the observance of traffic signals and signs. Additional sensors 120 may further detect and store data relating to the maintenance of the vehicle 114, such as the engine status, oil level, engine coolant temperature, odometer reading, the level of fuel in the fuel tank, engine revolutions per minute (RPMs), tire pressure, or combinations thereof. Certain vehicle sensors 120 may also collect information regarding the driver's route choice, whether the driver follows or deviates from a given route. In some examples, a Global Positioning System (GPS), locational sensors placed inside the vehicle 114, and/or locational sensors or devices external to the vehicle 114 may be used to determine the route, lane position, and other vehicle position or location information.

The data collected by the asset sensors 106 or vehicle sensors 120 may be stored or analyzed within the respective asset 104 or vehicle 114, or may be transmitted to one or more external devices. For example, as shown in FIG. 1, the sensor data may be transmitted to a digital security breach detection unit 108 or 118, which may be a collection of special-purpose computing devices that are interconnected and in signal communication with each other. The digital security breach detection unit 108 or 118 may be a separate special-purpose computing device or may be integrated into one or more components of the asset 104 or the vehicle 114 (e.g., the telematics device 116, the internal computing systems of the vehicle 114, and the like). The digital security breach detection unit 108 or 118 may be configured to perform functions associated with using the vehicle telematics data to detect any unauthorized manipulations of the asset 104 or vehicle 114. For example, the digital security breach detection unit 108 or 118 may analyze the sensor data and/or vehicle telematics data to generate an asset profile and/or vehicle profile based on historical trends. Further, the digital security breach detection unit 108 or 118 may analyze a new transaction at the asset 104 or vehicle 114 to determine whether it is an unauthorized manipulation. In some examples, the digital security breach detection unit 108 or 118 may determine whether the requesting device is pre-authorized by the asset 104 or vehicle 114, whether the location of the requesting device is within a threshold radius of the asset 104 or vehicle 114, and/or whether the transaction is consistent with the asset profile or vehicle profile.

In the example shown in FIG. 1, with respect to vehicles 114, the telematics device may receive vehicle telematics data from the vehicle sensors 120, and may transmit the data to the digital security breach detection system 130. The telematics device 116 may contain or may be integral with one or more of the vehicle sensors 120, or may be separate from the one or more of the vehicle sensors 120.

However, in other examples, one or more of the sensors may be configured to transmit data directly to the digital security breach detection system 130 without using a telematics device 116. For instance, a telematics device 116 may be configured to receive and transmit data from certain vehicle sensors 120, while other sensors may be configured to directly transmit data to a digital security breach detection system 130 without using the telematics device 116. Thus, in some embodiments, the telematics device 116 may be optional.

In some embodiments, a mobile special-purpose computing device 122 may be programmed with instructions to collect vehicle telematics data from the telematics device 116 or from the sensors 120, and then to transmit the vehicle telematics data to the digital security breach detection system 130 and other external computing devices. Further, the mobile special-purpose computing device 122 may include an accelerometer, a GPS unit, and a telecommunication unit. Software applications executing on the mobile special-purpose computing device 122 may be configured to detect vehicle telematics data independently and/or may communicate with the vehicle sensors 120 to receive additional vehicle telematics data. For example, a mobile special-purpose computing device 122 equipped with an accelerometer and/or a GPS unit may independently determine vehicle location, speed, direction, and other basic vehicle telematics data, without needing to communicate with the vehicle sensors 120, or any other vehicle system. In other examples, software on the mobile special-purpose computing device 122 may be configured to receive some or all of the vehicle telematics data collected by the vehicle sensors 120. In yet other examples, software on the mobile special-purpose computing device 122 may be configured to receive some or all of the vehicle telematics data from a telematics device 116 and/or third-party telematics systems.

When the mobile special-purpose computing device 122 within the vehicle 114 is used to detect vehicle telematics data or to receive vehicle telematics data from the vehicle 114, the mobile special-purpose computing device 122 may store, analyze, or transmit the vehicle telematics data to one or more other devices. For example, the mobile special-purpose computing device 122 may transmit vehicle telematics data to one or more other devices or systems. For example, the mobile special-purpose computing device 122 may transmit vehicle telematics data directly to the digital security breach detection system 130, and thus, may be used in conjunction with or instead of the telematics device 116. Moreover, the processing components of the mobile special-purpose computing device 122 may be used to collect and analyze vehicle telematics data to identify unauthorized manipulations of the vehicle 114. Therefore, in certain embodiments, the mobile special-purpose computing device 122 may be used in conjunction with, or in place of, the digital security breach detection unit 118.

In some embodiments, the functionality of the digital security breach detection unit 108 or 118 may be performed in the digital security breach detection system 130, rather than by the asset 104 or vehicle 114. In such implementations, the asset 104 or vehicle 114 might only collect and transmit sensor data and/or vehicle telematics data to the digital security breach detection system 130, and thus, the digital security breach detection unit 108 or 118 may be optional.

In some examples, the digital security breach detection system 130 may be configured to initiate communication with or receive data from an asset 104 or a vehicle 114 wirelessly via sensors 106, sensors 120, and/or telematics devices 116. In other examples, the asset 104 or vehicle 114 may notify the digital security breach detection system 130 of a new transaction, responsive to which the digital security breach detection system 130 may request or receive data from the asset 104 or vehicle 114.

The digital security breach detection system 130 may also be configured to send and receive data to and from an insurance system 140. For example, the digital security breach detection system 130 may be in direct communication with one or more databases within the insurance system 140, or may be in indirect communication with one or more databases within the insurance system 140 via a remote service (e.g., a web service). The digital security breach detection system 130 may request and receive data from the insurance system 140 (or one or more databases within the insurance system 140) regarding insurance policies associated with an asset. Further, the digital security breach detection system 130 may send data to the insurance system 140 regarding an insurance claim under an insurance policy for an asset.

The various components of the asset protection system 100 may be in signal communication via various types of networks. The networks may include one or more of a wired network, a wireless network, or a combination of wired or wireless networks. Example networks that may be selectively employed include wired and wireless local area networks (LANs), wide area networks (WANs) such as the Internet, cellular communication networks, Bluetooth, Near Field Communication (NFC), and other types of wired and wireless networks configured for telecommunication. Network communications may utilize various network communication protocols. Examples of network communications protocols that may be selectively employed include TCP/IP, Ethernet, FTP, HTTP, GSM, CDMA, Wi-Fi (802.11), and WiMAX.

Figure 2:
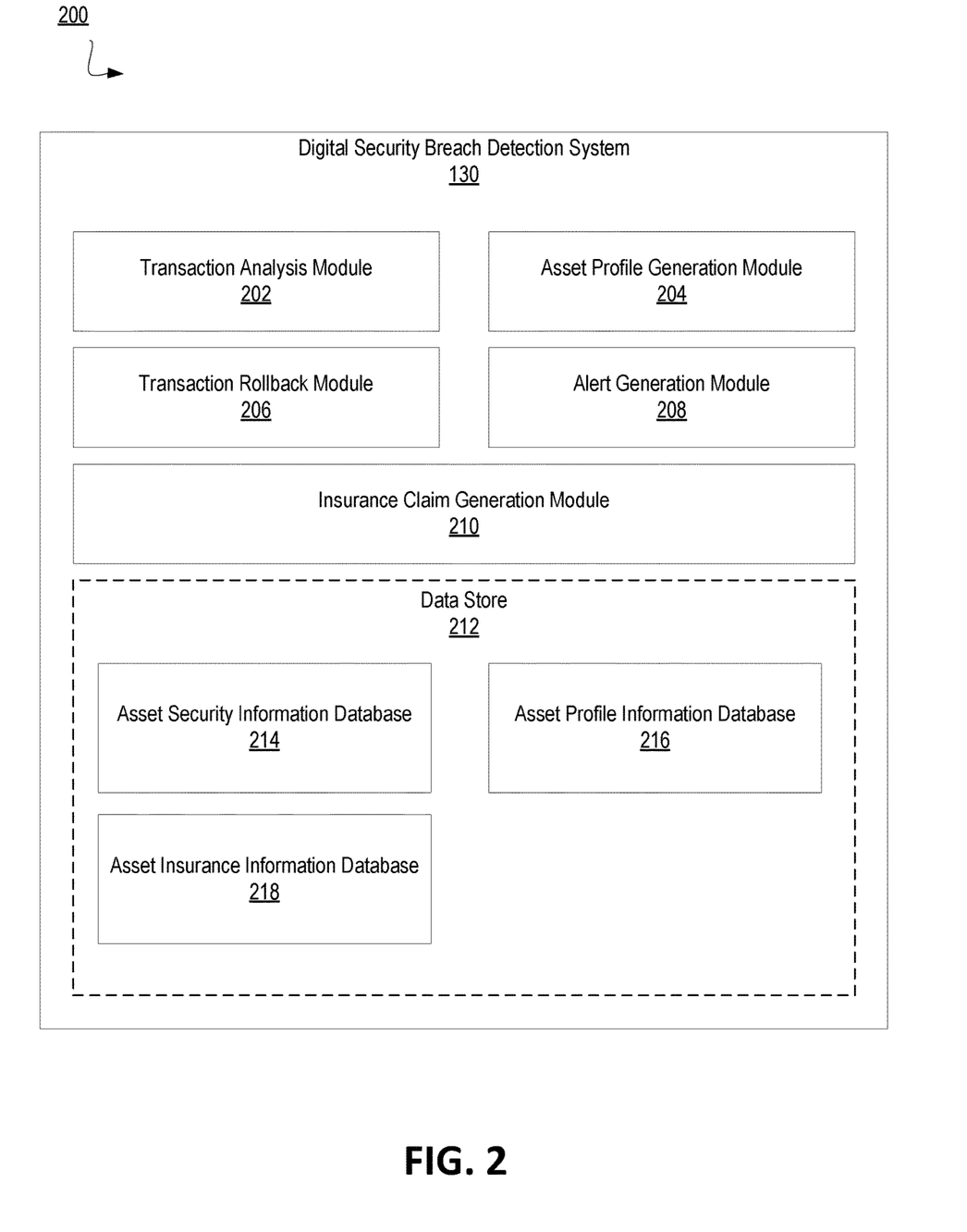
FIG. 2 is a block diagram of an example of an implementation of a digital security breach detection system according to one or more aspects of the disclosure.

With reference to FIG. 2, an example implementation of a digital security breach detection system 130 is shown. In this example, the digital security breach detection system 130 includes various modules and databases that include hardware and/or software configured to analyze transactions at various assets to detect unauthorized manipulations of the assets, generate asset profiles based on operational data and telematics data associated with various assets, cancel or rollback transactions responsive to detecting an unauthorized manipulation of an asset, generate alerts responsive to detecting an unauthorized manipulation of an asset, and generate an insurance claim responsive to detecting an unauthorized manipulation of an asset. It will be appreciated that the digital security breach detection system 130 illustrated in FIG. 2 is shown by way of example and that other implementations of the digital security breach detection system 130 may include additional or alternative units and databases without departing from the scope of the claimed subject matter. In this example, the digital security breach detection system 130 includes a transaction analysis module 202, an asset profile generation module 204, a transaction rollback module 206, an alert generation module 208, an insurance claim generation module 210, and a data store 212.

The transaction analysis module 202, the asset profile generation module 204, the transaction rollback module 206, the alert generation module 208, and the insurance claim generation module 210 will be discussed in further detail below with reference to FIG. 3.

The data store 212 may store information relating to asset security and asset profiles. For example, the data store 212 may include an asset security information database 214, an asset profile information database 216, and an asset insurance information database 218.

The asset security information database 214 may store information associated with the security of assets. In at least some embodiments, the asset security information database 214 may maintain one or more lists of devices from which transactions are approved or rejected. The asset security information database 214 may store information associated with one or more assets in the lists, including a unique device identifier (e.g., a device ID, a serial number, a Unique Device Identification (UDI/UDID/UUID), etc.), a device type (e.g., a desktop computer, a server, a mobile device, etc.), an Internet Protocol (IP) address, and so forth. In examples where a unique device identifier is unavailable, the asset security information database 214 may store a unique device key generated by the digital security breach detection system 130, where the unique device key may be a combination of one or more attributes of the device. In yet other examples, the asset security information database 214 may store one or more device attributes of a pre-authorized device. As such, any requesting device having these one or more device attributes may be pre-authorized. The asset security information database 214 may be keyed by a unique identifier associated with an asset (e.g., an asset ID).

For example, the asset security information database 214 may maintain a first list of devices from which transactions are approved (e.g., pre-authorized devices). In some examples, transactions received from devices in the first list may be automatically approved and executed. Additionally or alternatively, the asset security information database 214 may maintain a second list of devices from which transactions were previously approved (e.g., recognized devices). In some examples, transactions received from devices in the second list may not automatically be approved and executed. As such, further analysis of the device's location and the asset's profile may be required to approve and execute transactions from devices in the second list. Additionally or alternatively, the asset security information database 214 may maintain a third list of devices from which transactions were previously canceled or rolled back. Transactions from these devices may have been previously blocked or rolled back by the digital security breach detection system 130. In some examples, transactions received from devices in the third list may be automatically rejected. In other examples, transactions received from devices in the third list may be temporarily canceled or rolled back until approval is received from a pre-authorized device.

In other examples, the asset security information database 214 may maintain a whitelist (i.e., pre-authorized devices) and a blacklist (i.e., rejected devices). As such, transactions received from devices in the whitelist may be automatically approved, and transactions received from devices in the blacklist may be automatically rejected (i.e., canceled or rolled back).

The asset profile information database 216 may store information associated with the typical operation of assets. For example, the asset profile information database 216 may store operational data relating to an asset and telematics data relating to a vehicle. Further, the asset profile information database 216 may store historical trends based on the operational data and/or telematics data received from the one or more assets and/or telematics devices associated with an asset. The asset profile information database 216 may be keyed by a unique identifier associated with an asset (e.g., an asset ID). In some examples, the historical trends may be grouped by a sensor type (e.g., temperature, pressure, movement, location, etc.). In other examples, the historical trends may be grouped by one or more contextual attributes (e.g., day of the week, time of day, outside temperature, etc.).

The asset insurance information database 218 may store information associated with insurance policies covering particular assets (e.g., an insurance policy ID, an insurance provider, an insurance policy type, one or more terms of the insurance policy, etc.). The asset insurance information database 28 may be keyed by a unique identifier associated with an asset (e.g., an asset ID).

Figure 3:
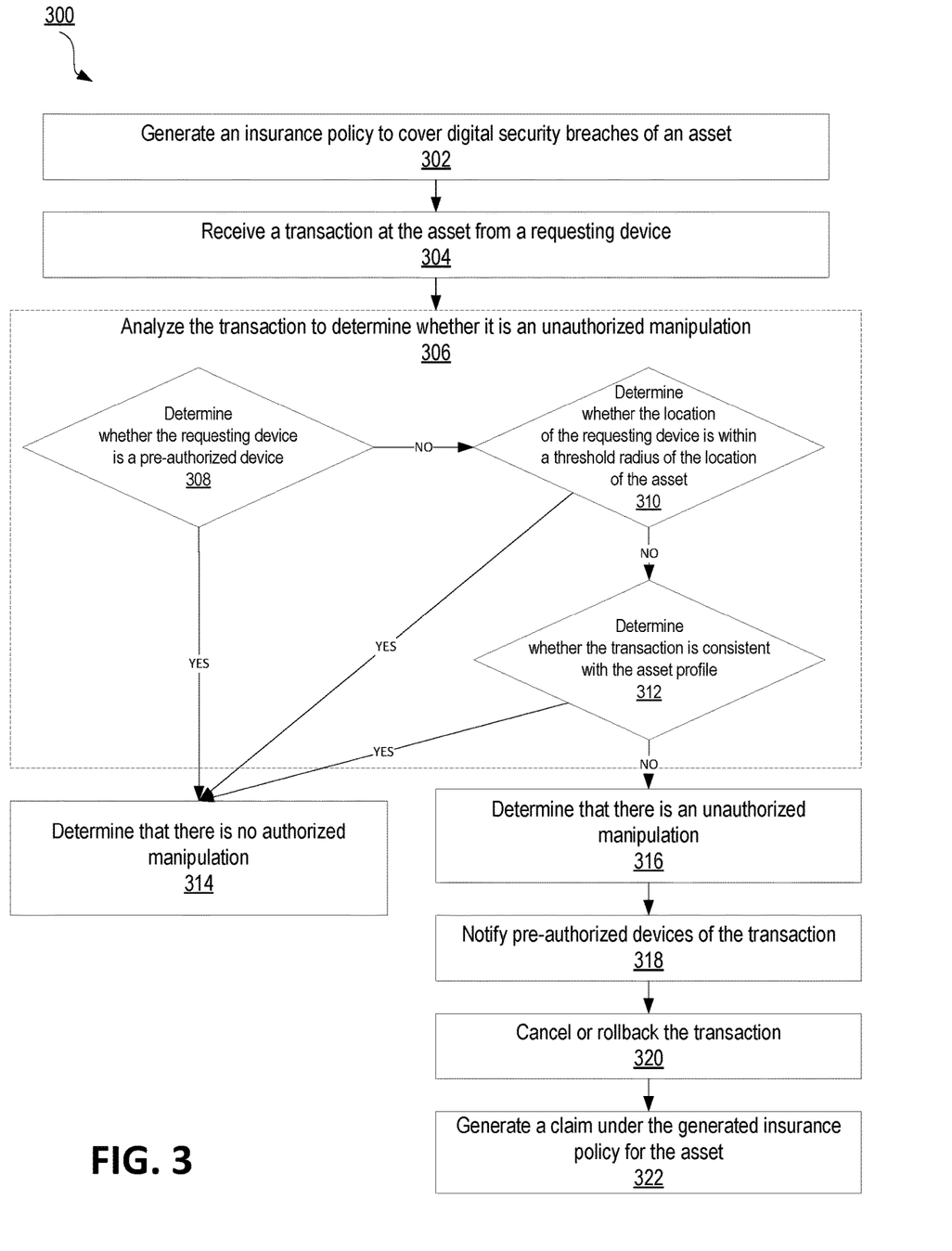
FIG. 3 is a flowchart of example method steps for detecting digital security breaches of a connected asset according to one or more aspects of the disclosure.

Referring now to FIG. 3, a flow-chart 300 of example steps for generating an insurance policy for an asset, receiving and analyzing transactions received at the asset based on operational data and vehicle telematics data, and detecting and responding to an unauthorized manipulation is shown. The various components of the digital security breach detection system 130 may be used to perform these steps.

A new asset 104 or 114 may be added to the asset protection system 100. As such, the digital security breach detection system 130 may be configured to protect the asset, and may be communicatively coupled to the asset 104 or 114, one or more sensors 106 or 120, and a telematics device 116. In some examples, the digital security breach detection system 130 may also be communicatively coupled with a digital security breach detection unit 108 or 118. Responsive to the asset being added to the asset protection system 100, information associated with the asset may be stored in the asset security information database 214. For instance, the digital security breach detection system 130 may store one or more devices as pre-authorized devices associated with the asset. Additionally or alternatively, the digital security breach detection system 130 may store one or more devices as blocked devices associated with the asset.

In some examples, the digital security breach detection system 130 may communicate with an insurance system 140 to generate an insurance policy to cover digital security breaches of the asset (step 302). In such examples, the digital security breach detection system 130 may send a request to create a new insurance policy to the insurance system 140. Alternatively, the digital security breach detection system 130 may send a request to update an existing insurance policy responsive to a new asset. Responsive to the request, the digital security breach detection system 130 may receive information associated with the new or existing insurance policy. In cases where the asset is already associated with an insurance policy for digital security breaches, the digital security breach detection system 130 may retrieve information associated with the existing insurance policy. Additionally, in some examples, the digital security breach detection system 130 may communicate with the insurance system 140 to send a request to update an existing insurance policy responsive to an asset being removed (e.g., asset is no longer eligible for insurance coverage, asset is upgraded, asset is replaced, asset is destroyed, etc.).

In the above examples, the digital security breach detection system 130 may store information associated with the insurance policy in the asset insurance information database 218.

In step 304, the digital security breach detection system 130 may be notified of a new transaction received at the asset 104 or 114 from a computing device 110 or a mobile computing device 112. In some examples, the asset 104 or 114 may notify the digital security breach detection system 130 of a new transaction received at the asset 104 or 114. In other examples, the digital security breach detection unit 108 or 118 may notify the digital security breach detection system 130 of a new transaction received at the asset 104 or 114. In an alternate example, the digital security breach detection system 130 may periodically poll the asset 104 or 114 to identify any new transactions. In such examples, the asset 104 or 114 may maintain a list of incoming transactions. These incoming transactions may be placed on a temporary hold until analyzed by the digital security breach detection system 130.

The transaction analysis module 202 of the digital security breach detection system 130 may analyze the new transaction to determine whether it is an unauthorized manipulation of the asset 104 or 114 (step 306). In some examples, the digital security breach detection system 130 may execute a hierarchical analysis to detect an unauthorized manipulation. For example, at the first level of the hierarchical analysis, the transaction analysis module 202 may determine whether the requesting device is a pre-authorized device (step 308). As such, the transaction analysis module 202 may query the asset security information database 214, by the asset ID of the asset 103 or 114, for a list of pre-authorized devices. The transaction analysis module 202 may then determine whether the requesting device 110 or 112 is in the list of pre-authorized devices. In some examples, the comparison may be based on a unique device identifier received from the requesting device 110 or 112. In other examples, the comparison may be based on a unique device key, where the unique device key is generated by the transaction analysis module 202 based on a combination of one or more attributes of the device. In yet other examples, the comparison may be based on one more attributes of a pre-authorized device, whereby any requesting device 110 or 112 having the one or more attributes is considered a pre-authorized device. In these examples, the one or more attributes of a pre-authorized device may enable the transaction analysis module 202 to pre-authorize more than one requesting device, in contrast to a unique identifier. As such, a pre-authorized device may be identified by either a unique identifier or by one or more device attributes, and thus, a pre-authorized device may correspond to exactly one device 110 or 112, or it may correspond to a plurality of devices 110 or 112 having the prescribed attributes.

In examples where the requesting device 110 or 112 is included in the list of pre-authorized devices for the asset 104 or 114, the transaction analysis module 202 may determine that there is no unauthorized manipulation of the asset (step 314). In these cases, any temporary holds on the transaction may be removed, and the transaction will be executed.

By contrast, in examples where the requesting device 110 or 112 is not included in the list of pre-authorized devices for the asset 104 or 114, the transaction analysis module 202 may, at the second level of the hierarchical analysis, determine whether the location of the requesting device 110 or 112 is within a threshold radius (e.g., within 1 mile, within 5 miles, etc.) of the location of the asset 104 or 114 (step 310). Location may be expressed as a coordinate (e.g., a latitude and longitude combination), an address, as a point of interest, an IP address, etc. In examples where the location of the asset is expressed in a different format from the location of the requesting device, the transaction analysis module 202 may standardize all locations to be expressed in the same format (e.g., as coordinates). For example, the transaction analysis module 202 may be in signal communication with an address standardization service, for example, via an application program interface (API). In another example, the transaction analysis module 202 may be in signal communication with an IP geolocation service, for example, via an API, whereby the transaction analysis module 202 may receive a coordinate associated with the IP address. It will be appreciated that in some examples the results of the IP geolocation service may be less precise than a specific coordinate, and as such, may only identify a zip code, city, region, or country associated with the IP address. In these examples, the location may be expressed as a set of coordinates that define the zip code, city, region, or country.

In some examples, the location of the requesting device 110 or 112 may be included in the transaction. Alternatively, the transaction analysis may request location information from the requesting device 110 or 112.

The location of the asset 104 or 114 may be retrieved from the asset directly, either at time of the transaction or at the time of the analysis by the transaction analysis module 202. For example, the location of the asset 104 may be derived from the operational data received from the one or more sensors 106 or 120 associated with the asset, from a telematics device 116, from a mobile special-purpose computing device 122 (e.g., a mobile application installed on the mobile special-purpose computing device 122, a GPS sensor installed on the mobile special-purpose computing device, etc.), or a combination thereof.

In examples where the location of the requesting device 110 or 112 is within a threshold radius of the location of the asset 104 or 114, the transaction analysis module 202 may determine that there is no unauthorized manipulation of the asset (step 314). In these cases, any temporary holds on the transaction may be removed, and the transaction will be executed. In some cases, even where the locations are within a threshold radius, the transaction analysis module 202 may determine that there is insufficient data to make a determination as to whether the transaction is an unauthorized manipulation. For instance, where the IP geolocation service is unable to resolve an IP address of the requesting device 110 or 112 to a specific coordinate, the transaction analysis module 202 may elect to perform the third level of the hierarchical analysis. Accordingly, it follows that the transaction analysis module 202 may be configured to perform one or more levels of the hierarchical analysis to reach an ultimate determination on whether a transaction is an unauthorized manipulation of the asset.

At the third level of the hierarchical analysis, in examples where the location of the requesting device 110 or 112 is not within a threshold radius of the location of the asset 104 or 114, or in examples where the transaction analysis module 202 elects to perform the third level, the transaction analysis module 202 may determine whether the transaction is consistent with an asset profile of the asset 104 or 114 (step 312). The transaction analysis module 202 may query the asset profile information database 216, by the asset ID of the asset 103 or 114, for the asset profile. The transaction analysis module 202 may then determine whether the intended result of the transaction is consistent with the asset profile.

An asset profile for an asset 104 or 114 may be generated by the asset profile generation module 204. For example, the asset profile generation module 204 may analyze historical trends in the operational data and/or vehicle telematics data of an asset. The asset profile generation module 204 may receive and analyze sensor data (e.g., from one or more sensors 106 or 120 installed at, attached to, and/or remotely located relative to the asset 104 or 114), vehicle telematics data from a vehicle 114 (e.g., from a telematics device 116 installed at or attached to the vehicle), from a mobile special-purpose computing device 122 (e.g., a mobile application installed on a mobile special-purpose computing device 122), or a combination thereof. In some examples, the sensor data and vehicle telematics data may first be collected as a central location (e.g., at the digital security breach detection unit 108 or 118) and subsequently provided to the asset profile generation module 204. Thus, the asset profile generation module 204 may receive sensor data and vehicle telematics data from the various sources in real-time, or may receive a compiled version of the data from the central location. Alternatively, the asset profile generation module 204 may periodically request sensor data and vehicle telematics data from the asset.

The asset profile generator module 204 may determine normal operating conditions for an asset 104 or 114 based on the sensor data and/or the vehicle telematics data. In some examples, the asset profile generator module 204 may determine normal operating conditions under various circumstances. For example, the asset profile generator module 204 may identify one set of normal operating conditions for an air conditioning unit during business hours or during weekdays, and another set of normal operating conditions after business hours or during weekends. In some examples, normal operating conditions may be expressed as a range of values (e.g., 60° F. to 65° F. during business hours, 70° F. to 75° F. on the weekends, etc.). Alternatively, normal operating conditions may be expressed as an average value (e.g., an average temperature of 65° F. on the weekdays, etc.). Further, the asset profile generator module 204 may analyze the historical sensor data and/or vehicle telematics data to determine a maximum value (e.g., a maximum temperature of 85° F., etc.) and a minimum value (e.g., a minimum temperature of 60° F., etc.) for one or more characteristics of the asset 104 or 114. Based on the normal operating conditions, the asset profile generator module 204 may determine an asset profile for the asset 104 or 114. Further, the asset profile generator module 204 may store the asset profile in the asset profile information database 216.

In examples where the intended result of the transaction is consistent with the asset profile, the transaction analysis module 202 may determine that there is no unauthorized manipulation of the asset (step 314). A transaction may be consistent with the asset profile when the intended result of the transaction is within the normal operating conditions for the asset under the circumstances. For example, a transaction received at a water heater to modify the temperature to 120° F. is consistent with an asset profile that defines the normal temperature range to be between 110° F. and 140° F.

In contrast, in examples where the intended result of the transaction is not consistent with the asset profile, the transaction analysis module 202 may determine that there is an unauthorized manipulation of the asset (step 316). For instance, where a vehicle's asset profile defines the normal speed range between 5 PM and 6 PM to be between 10 mph and 40 mph, a transaction received at a vehicle 114 to increase the speed to 120 mph is not consistent with the vehicle's asset profile.

Responsive to detecting an unauthorized manipulation of an asset 104 or 114, the alert generation module 208 may notify one or more pre-authorized devices 132 or 134 of the asset regarding the transaction (step 318). In some examples, the notification may indicate a level of severity of the alert (e.g., low risk, medium risk, high risk, etc.). The level of severity may be based, at least in part, on the type of device and/or the potential risk/damage caused by allowing the transaction. For instance, the digital security breach detection system 130 may assign a higher level of severity to notifications regarding a vehicle asset, and a lower level of security to notifications regarding a coffee maker asset. In another example, the digital security breach detections system 130 may assign a higher level of security to notifications regarding a transaction changing a vehicle's speed to 120 mph, and a lower level of security to notifications regarding a transaction changing a vehicle's speed to 50 mph.

In some examples, the alert generation module 208 may allow one or more of the pre-authorized devices 132 or 134 to override the determination of the digital security breach detection system 130. As such, a pre-authorized device 132 or 134 of an asset 104 or 114 may send a notification to the digital security breach detection system 130 to allow the transaction from the requesting device 110 or 112. Accordingly, in these examples, the digital security breach detection system 130 may notify the asset 104 or 114 to allow and execute the transaction.

Figure 4:
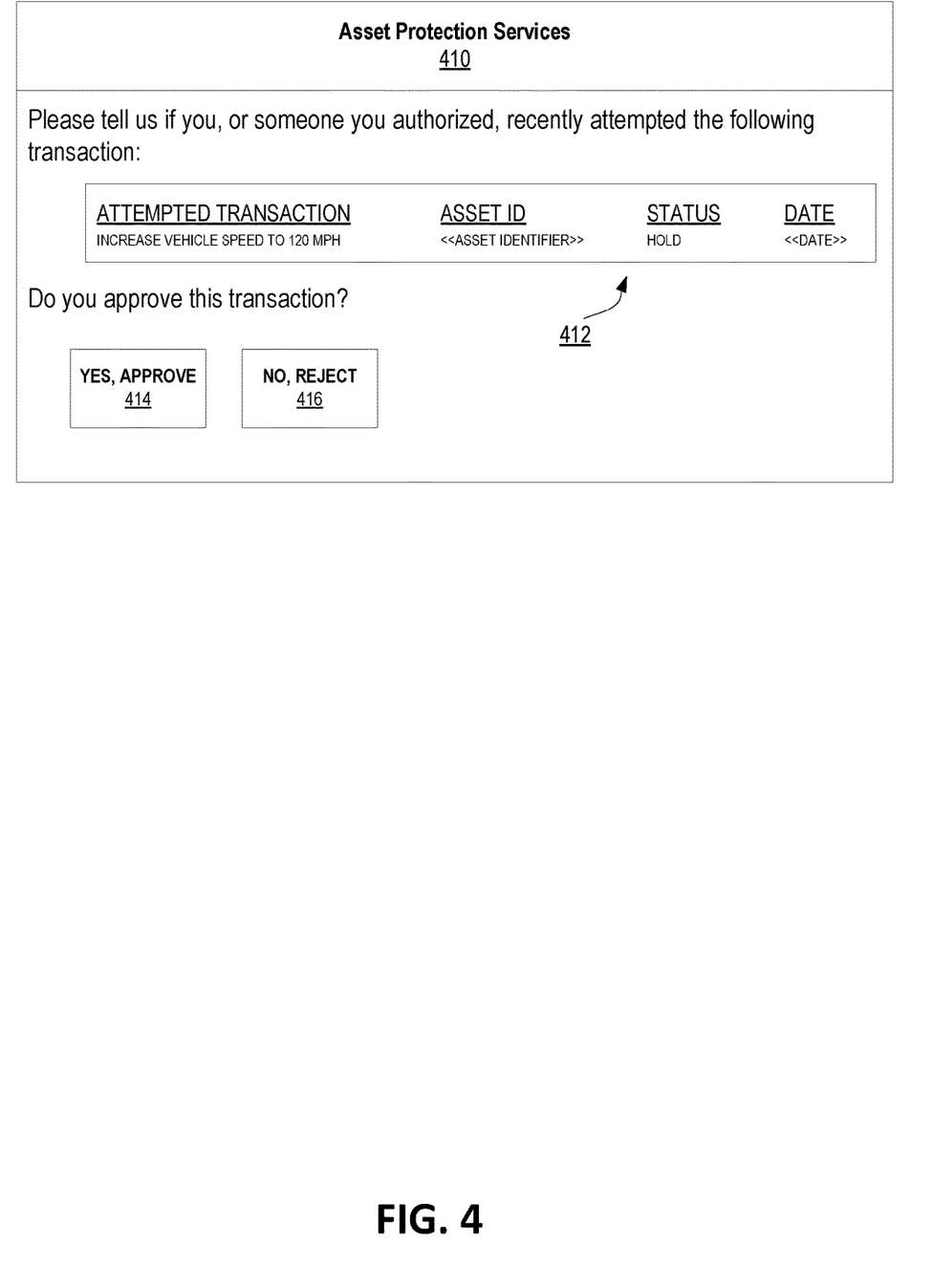
FIG. 4 is an example user interface of an asset protection system configured to provide alerts according to one or more aspects of the disclosure.
Figure 5:
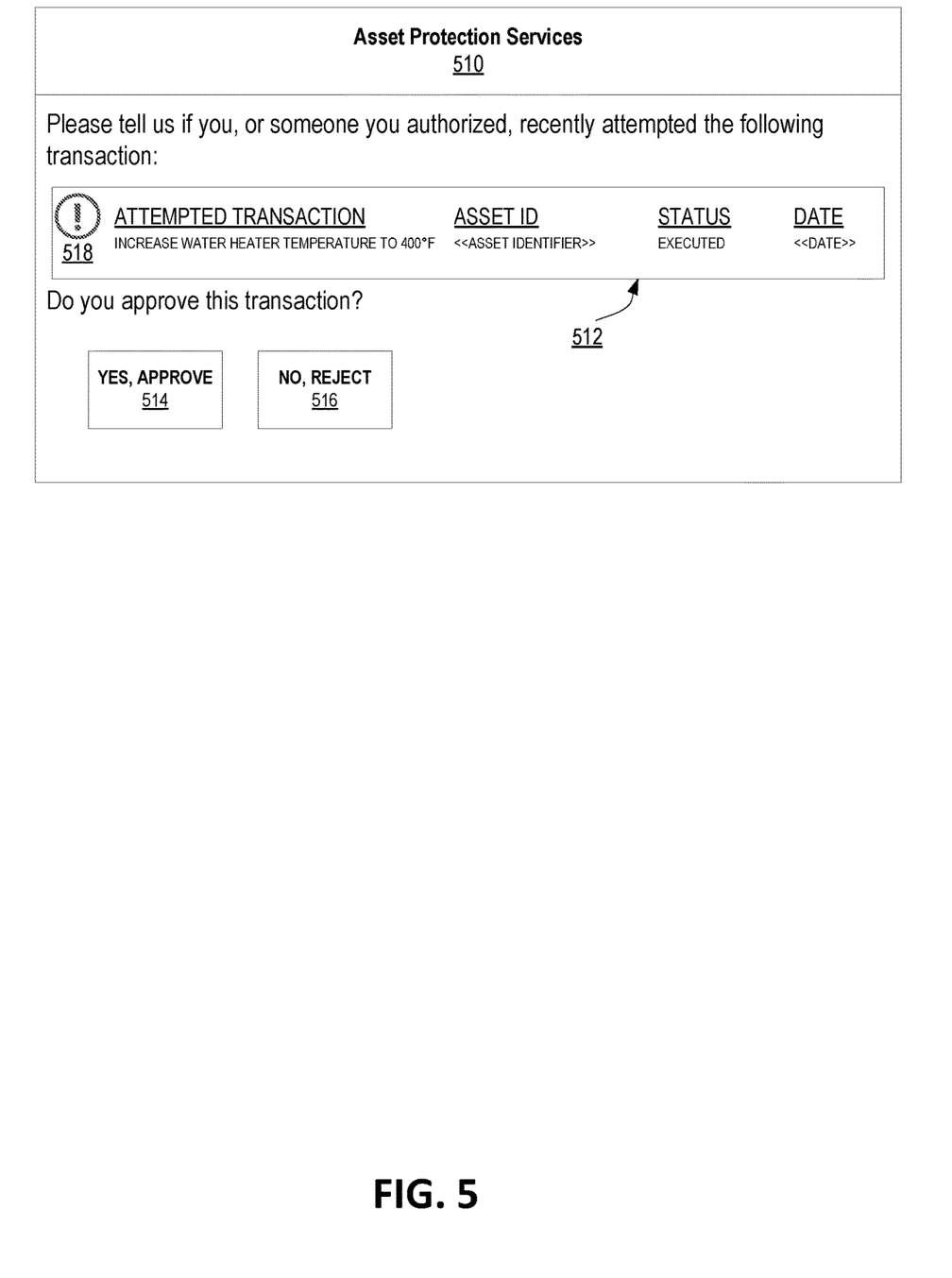
FIG. 5 is an example user interface of an asset protection system configured to provide alerts according to one or more aspects of the disclosure.

FIGS. 4 and 5 show example user interfaces 410 and 510 which may be configured to provide alerts to a pre-authorized device 132 or 134. Thus, the pre-authorized device 132 or 134 may be configured to display textual and/or graphical alerts pertaining to transactions received at the asset. The example user interfaces 410 and 510 may also enable the pre-authorized device 132 or 134 to provide instructions (e.g., to allow the transaction, to reject the transaction, etc.) to the digital security breach detection system 130 in response to the alerts. In examples where the pre-authorized device 132 or 134 is a mobile device, the user interface may be displayed on a mobile application installed on the pre-authorized device 132 or 134. The user interface, as shown by components 412 and 512 of example user interfaces 410 and 510, may include a description of the attempted transaction, an asset ID and/or a description of the asset, a transaction status, and a transaction date. The user interfaces 410 and 510 may also include one or more input fields to allow the pre-authorized devices 132 and 134 to respond to the notification. In example user interfaces 410 and 510, the one or more input fields are buttons for approving the transaction 414 and 424 and buttons for rejecting the transaction 416 and 426. Further, as shown in FIG. 5, the user interface 510 may indicate a level of severity 518 associated with the notification.

In some examples, where the pre-authorized device 132 or 134 is a mobile device, the notification may additionally be provided as a push notification. In other examples, the user interface 400 may be displayed on a desktop browser, on a mobile browser, or via a Short Message Service (SMS).

Further, the digital security breach detection system 130 may associate the requesting device 110 or 112 to asset 104 or 114 in the asset security information database 214 (e.g., add the requesting device to the first list of pre-authorized devices, the second list of previously approved devices, or the whitelist, etc.). In contrast, where a pre-authorized device of an asset either sends a notification to the digital security breach detection system 130 to reject the transaction (i.e., affirming the detection of the unauthorized manipulation) or does not provide any notification within a threshold time, the digital security breach detection system 130 may confirm that the transaction is an unauthorized transaction. It will be appreciated that allowing a pre-authorized device to override the determination of the digital security breach detection system 130 is optional.

In examples involving an unauthorized manipulation, the transaction rollback module 206 may either cancel or rollback the transaction (step 320). As such, the transaction rollback module 206 may send either a cancellation instruction or a rollback instruction to the breached asset. A transaction cancellation may be appropriate where the transaction was placed on a temporary hold and has not yet been executed. A transaction cancellation will ensure that the transaction is not executed by the asset 104 or 114. Alternatively, a transaction rollback may be appropriate where some or all steps of the transaction have been executed by the asset. In this example, the rollback instruction may require the asset 104 or 114 to reverse the some or all executed steps of the transaction, in order to return the asset to its prior state. Responsive to completing the cancellation or rollback, the transaction rollback module 206 may associate the requesting device 110 or 112 to the asset 104 or 114 in the asset security information database 214 (e.g., add the requesting device to the third list of previously rejected devices, or the blacklist, etc.).

In examples where some or all steps of a transaction were executed by the asset 104 or 114, thereby causing irreversible damage to the asset, the insurance claim generation module 210 of the digital security breach detection system 130 may generate a claim under the insurance policy identified in step 302 (step 322). As such, the insurance claim generation module 210 may be in signal communication with an insurance system 140.

In some examples, the insurance system 140 may provide incentives, such as lower insurance rates, for assets in the asset protection system 100. Further, some or all of the data collected by the digital security breach detection system 130 may be communicated to the insurance system 140. For instance, the insurance system 140 may receive operational data and/or telematics data associated with an asset in the asset protection system 100. As such, the insurance system 140 may adjust insurance rates for assets in the asset protection system 100 based on the received data. For instance, where operational data and/or telematics data associated with an asset indicates safe behavior, the insurance system 140 may decrease insurance rates for the asset. By contrast, where operational data and/or telematics data associated with an asset indicates unsafe and/or risky behavior (e.g., a garage door is left open for extended hours, a water heater set at a high temperature, a vehicle driving above the speed limit, etc.), the insurance system 140 may increase insurance rates for the asset.

However, the asset protection system 100 ensures that insurance rates are not negatively impacted when the unsafe and/or risky behavior was caused by an unauthorized manipulation. In these examples, the insurance system 140 may not increase insurance rates for an asset where the digital security breach detection system 130 identifies an unauthorized manipulation of the asset, and notifies the insurance system 140 of such unauthorized manipulation. For instance, in examples where an unauthorized manipulation causes a vehicle to travel at 120 mph, the digital security breach detection system 130 may notify the insurance system 140 of the unauthorized manipulation, thus ensuring that insurance rates for the vehicle are not negatively impacted.

While the disclosure has been described with respect to specific examples including presently illustrative modes of carrying out the disclosure, a person having ordinary skill in the art, after review of the entirety disclosed herein, will appreciate that there are numerous variations and permutations of the above-described systems and techniques that fall within the spirit and scope of the disclosure.

What is claimed is:

1. A digital security breach detection system comprising:
at least one processor; and
memory storing computer-readable instructions, that when executed by the at least one processor, cause the at least one processor to:
   receive a first transaction from a requesting device, the first transaction requesting a modification of an asset the first transaction including one or more steps;
   provide instructions to the asset to issue a temporary hold on the first transaction;
   analyze the first transaction to determine if the first transaction is an unauthorized manipulation, the analysis including:
      determine whether the requesting device is associated with one or more pre-authorized devices;
      responsive to determining the requesting device is not associated with the one or more pre-authorized devices, determine a location of the requesting device and an asset location, the asset location determined using sensor data collected from one or more sensors of the asset; and
      responsive to determining that a difference between the location of the requesting device and the asset location exceeds a threshold, determine whether the first transaction is consistent with an asset profile by comparing the modification with a historical range;
   determine whether the first transaction is an unauthorized manipulation based on the analysis;
   responsive to determining that the first transaction is the unauthorized manipulation, notify the asset of the unauthorized manipulation and provide instructions to the asset to remove the temporary hold and cancel the first transaction.

2. The digital security breach detection system of claim 1, wherein:
the asset is a vehicle, the vehicle including a telematics device; and
the computer-readable instructions, when executed by the at least one processor, further cause the at least one processor to:
   receive vehicle telematics data from the telematics device.

3. The digital security breach detection system of claim 1, wherein the computer-readable instructions, when executed by the at least one processor, further cause the at least one processor to:
receive a second transaction requesting a second modification of the asset from a second requesting device, the second transaction including one or more steps;
determine a second unauthorized manipulation; and
generate instructions to rollback at least one of the one or more steps of the second transaction.

4. The digital security breach detection system of claim 1, wherein the computer-readable instructions, when executed by the at least one processor, further cause the at least one processor to:
generate instructions to execute the first transaction based on an override instruction provided by at least one of the one or more pre-authorized devices.

5. The digital security breach detection system of claim 1, wherein the one or more sensors include at least one of a motion sensor, a presence sensor, a light sense, a pressure sensor, a fluid sensor, a sound sensor, a temperature sensor, a chemical sensor, an electric sensor, a magnetic sensor, or a vibration sensor.

6. The digital security breach detection system of claim 1, wherein the asset is disposed within a home.

7. The digital security breach detection system of claim 1, wherein the one or more sensors detect at least one of impact to the asset, air bag deployment, headlights usage, brake light operation, a door opening and closing, a door locking and unlocking, cruise control usage, hazard lights usage, windshield wiper usage, horn usage, turn signal usage, seat belt usage, phone and radio usage within the asset, or maintenance performed on the asset.

8. A method comprising:
receiving a first transaction from a requesting device, the first transaction requesting a modification of an asset, the requesting device associated with one or more pre-authorized devices, and the first transaction including one or more steps;
providing instructions to the asset to issue a temporary hold on the first transaction;
analyzing the first transaction to determine if the first transaction is an unauthorized manipulation, the analysis including:
determining whether the requesting device is associated with one or more pre-authorized devices;
responsive to determining the requesting device is not associated with the one or more pre-authorized devices, determining a location of the requesting device and an asset location, the asset location determined using sensor data collected from one or more sensors of the asset; and
responsive to determining that a difference between the location of the requesting device and the asset location exceeds a threshold, determining whether the first transaction is consistent with an asset profile by comparing the modification with a historical range;
determining whether the first transaction is an unauthorized manipulation based on the analysis;
responsive to determining that the first transaction is the unauthorized manipulation, notifying the asset of the unauthorized manipulation and providing instructions to the asset to remove the temporary hold and cancel the first transaction.

9. The method of claim 8, wherein:
the asset is a vehicle, the vehicle including a telematics device; and
the method further comprising:
receiving vehicle telematics data from the telematics device.

10. The method of claim 8 further comprising:
receiving a second transaction requesting a second modification of the asset from a second requesting device, the second transaction including one or more steps; and
generating instructions to rollback at least one of the one or more steps of the second transaction.

11. The method of claim 8 further comprising:
generating instructions to execute the first transaction based on an override instruction provided by a pre-authorized device.

12. The method of claim 8, wherein the one or more sensors includes at least one of a motion sensor, a presence sensor, a light sense, a pressure sensor, a fluid sensor, a sound sensor, a temperature sensor, a chemical sensor, an electric sensor, a magnetic sensor, or a vibration sensor.

13. The method of claim 8, wherein the asset is disposed within a home.

14. The method of claim 8, wherein the one or more sensors detects at least one of impact to the asset, air bag deployment, headlights usage, brake light operation, a door opening and closing, a door locking and unlocking, cruise control usage, hazard lights usage, windshield wiper usage, horn usage, turn signal usage, seat belt usage, phone and radio usage within the asset, or maintenance performed on the asset.

15. A non-transitory computer-readable medium storing instructions for controlling a processor, the instructions causing the processor to perform steps comprising:
receiving a first transaction from a requesting device, the first transaction requesting a modification of an asset, the requesting device associated with one or more pre-authorized devices, and the first transaction including one or more steps;
providing instructions to the asset to issue a temporary hold on the first transaction;
analyzing the first transaction to determine if the first transaction is an unauthorized manipulation, the analysis including:
determining whether the requesting device is associated with one or more pre-authorized devices;
responsive to determining the requesting device is not associated with the one or more pre-authorized devices, determining a location of the requesting device and an asset location, the asset location determined using sensor data collected from one or more sensors of the asset; and
responsive to determining that a difference between the location of the requesting device and the asset location exceeds a threshold, determining whether the first transaction is consistent with an asset profile by comparing the modification with a historical range;
determining whether the first transaction is an unauthorized manipulation based on the analysis;

responsive to determining that the first transaction is the unauthorized manipulation, notifying the asset of the unauthorized manipulation and providing instructions to the asset to remove the temporary hold and cancel the first transaction.

16. The non-transitory computer-readable medium of claim 15,
wherein:
the asset is a vehicle, the vehicle including a telematics device; and
the processor further performs steps comprising:
receiving vehicle telematics data from the telematics device.

17. The non-transitory computer-readable medium of claim 15, the processor further performs steps comprising:
receiving a second transaction requesting a second modification of the asset from a second requesting device, the second transaction including one or more steps; and
generating instructions to rollback at least one of the one or more steps of the second transaction.

18. The non-transitory computer-readable medium of claim 15, the processor further performs steps comprising:
generating instructions to execute the first transaction based on an override instruction provided by a pre-authorized device.

19. The non-transitory computer-readable medium of claim 15, wherein the one or more sensors includes at least one of a motion sensor, a presence sensor, a light sense, a pressure sensor, a fluid sensor, a sound sensor, a temperature sensor, a chemical sensor, an electric sensor, a magnetic sensor, or a vibration sensor.

20. The non-transitory computer-readable medium of claim 15, wherein the one or more sensors detects at least one of impact to the asset, air bag deployment, headlights usage, brake light operation, a door opening and closing, a door locking and unlocking, cruise control usage, hazard lights usage, windshield wiper usage, horn usage, turn signal usage, seat belt usage, phone and radio usage within the asset, or maintenance performed on the asset.

* * * * *